UNITED STATES PATENT OFFICE.

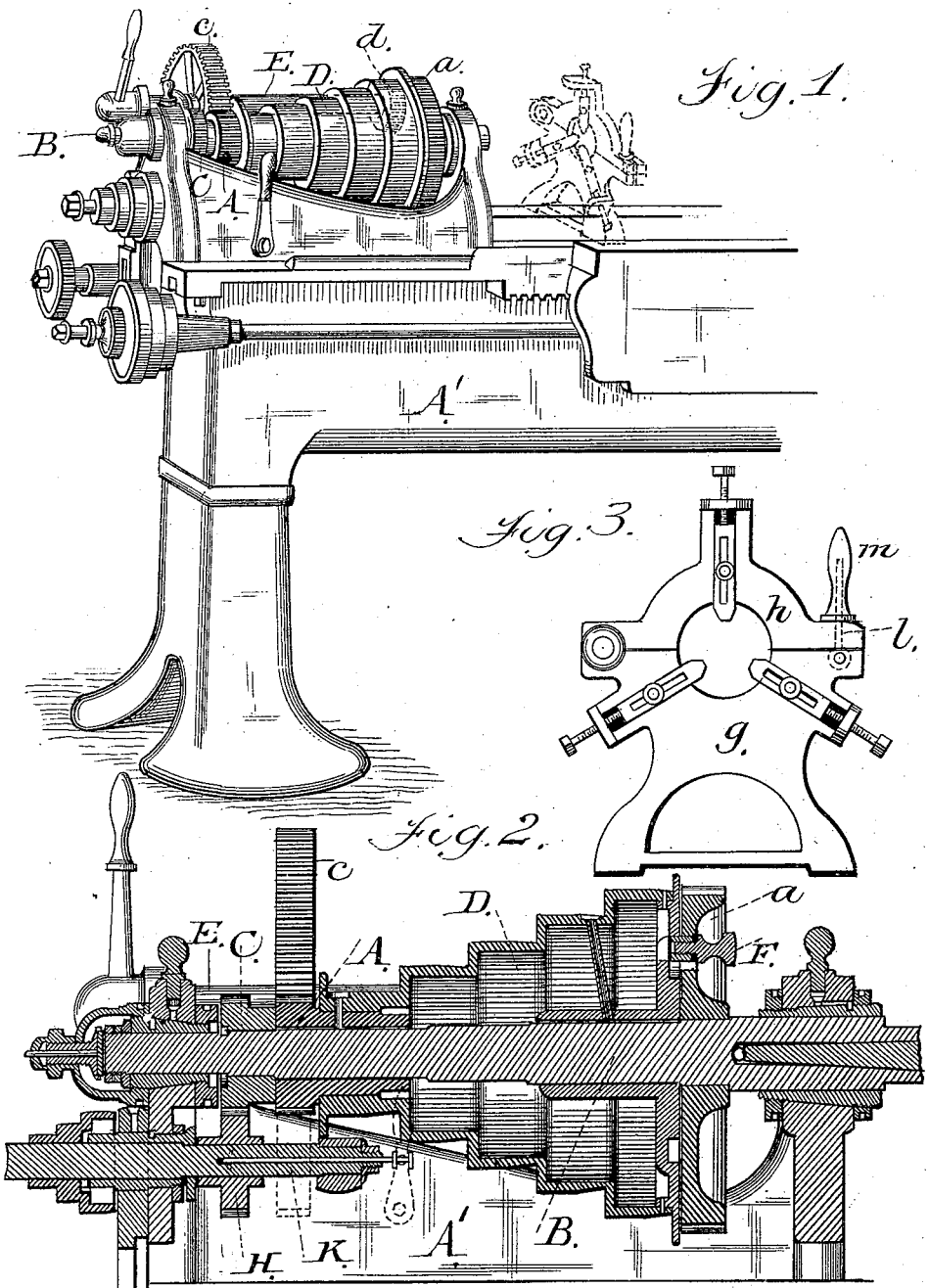

SALMON W. PUTNAM, OF FITCHBURG, MASSACHUSETTS.

LATHE.

SPECIFICATION forming part of Letters Patent No. 313,447, dated March 3, 1885.

Application filed May 19, 1884. (No model.)

*To all whom it may concern:*

Be it known that I, SALMON W. PUTNAM, a citizen of the United States, and residing at Fitchburg, in the county of Worcester and State of Massachusetts, have invented certain new and useful Improvements in Lathes, of which the following is a full, clear, and exact description, reference being had to the accompanying drawings, forming part of this specification, in which—

Figure 1 represents a portion of a lathe in perspective with my improvements attached. Fig. 2 represents a section of the same. Fig. 3 is a detail of my improved back-rest, in all of which similar letters of reference indicate corresponding parts.

My invention relates to means applied to a lathe for changing or increasing the velocity, thereby increasing the range and capacity of the lathe for screw cutting and turning purposes; and my invention consists in the novel arrangement and combination of devices, all of which will be hereinafter more fully described, and specifically pointed out in the claims.

To enable others skilled in the art to make and use my invention, I will now proceed to describe the exact manner in which I have carried it out.

Heretofore various devices have been applied to lathes for the purpose of utilizing the increased velocity of the ordinary cone or cone-pulley or its pinion for the purpose of increasing the power and capacity of the lathe, but for various reasons the object sought has not been successfully obtained. To remove these difficulties, and furnish to the trade a simple and durable lathe, is the purpose of my present invention.

In the said drawings, A' represents the housing of an ordinary lathe-head, and B the spindle, which is constructed in a manner substantially as shown in Fig. 2. To this spindle is rigidly keyed the spindle-feed gear-wheel C, to be hereinafter more fully explained, and the cone or cone-pulley D is loosely mounted on said spindle, while the lathe is also provided with the ordinary back gears, which may be secured on the spindle B and sleeve-shaft E by any of the well-known means.

It will be seen from the drawings that the cone-pinion A is attached to the cone and transmits its motion to the gears *c* and *d*, which are fast on the sleeve-shaft E, and the gear *c*, before referred to, in turn transmits motion to the gear *a*, which is fast on the spindle B. The gear *a* is provided with a clutch-block, F, by means of which the cone and gear are locked, and when this clutch-block is withdrawn or unlocked the cone is still allowed to revolve on the spindle by means of the gears A and C. In this class of lathes it is desirable to use the back gears, and when this is done the cone-pinion makes (by preference) nine revolutions to one of the spindle-feed gear C.

In the construction of lathes embodying my improvements I make the two gears A and C the same diameter and the teeth of the same pitch, so that I am enabled to slide the gear H from its contact with the spindle-gear C until it meshes with the cone-gear A. Located beneath the spindle B is the feed-stud K, on which is mounted the stud-gear H, whose diameter and pitch of teeth in this case is the same as that of the gears A and C, with which it engages. In some cases, on account of obtaining a more desirable pitch to the leading-screw of the lathe, I make this gear twice the size of feed-gear C and cone-pinion A, but of the same pitch. When this gear H on the feed-stud K is in contact with the gear C, the velocity of the feed-stud (which communicates motion to the lathe for both cutting and feed purposes) is as if imparted through spindle B; but when the stud-gear H is moved out of engagement by a lever or other suitable means with the gear C, and is caused to engage with the cone-pinion A, the velocity of the stud K is increased ninefold, and this increase of power in turn increases the range and capacity of the lathe when used for screw cutting and turning purposes in the ratio of nine to one.

To make this feature of my invention more manifest, I would say, when clutch-block D is not locked to cone-pulley and spindle-gear, and also when back gears, *c* and *d*, are not engaged, the cone-pulley, with its pinion-gear, will simply revolve on spindle B, the latter remaining idle. If gears c and d be thrown in contact with cone-pinion and spindle-gear a, (motion being given to cone-pulley,) spindle, B is then caused to revolve, but at a slower velocity than cone-pinion—i. e., we will assume cone-pinion to have twenty-eight cogs, and c (which meshes into it) to have eighty-four cogs. Now, in order to give this latter gear, c, one revolution, the cone-pinion will have to revolve three times, for the reason that there are only one-third as many cogs in it. Gears c and d being solid on the same shell, of course make one revolution in the same time. Gear d, we will say, has twenty-four cogs, and spindle-gear a (which meshes into it) has seventy-two cogs. Now, again, in order to give spindle-gear a (which is fast on spindle B) one revolution, gear d will also have to make three revolutions, which shows the motion of spindle B in the ratio of three times three, or nine times. Now, to reverse the illustration, we will commence with spindle B and its gear a by supposing them to make one revolution. Pinion-gear d (twenty-four cogs) will have to make three revolutions, and while said pinion is making three revolutions gear a (eighty-four cogs) also makes three revolutions, and while said gear c is making three revolutions cone-pinion (twenty-eight cogs) will have to make three times as many, or nine revolutions. It will be understood, of course, that these series and ratios are not arbitrary in the mechanical construction of a lathe. I have employed them as being proportionately good for practical use. A change in sizes of the respective gears would cause a relative change in ratio of velocity of cone to spindle.

As an equivalent for the sliding gear H on stud K, two gears may be arranged to revolve on said stud, one gear meshing with feed-gear C, the other with cone-pinion A. An external or internal sliding clutch attached to stud K may serve to communicate the velocity of either said gear to stud K. In this arrangement the relative size and pitch of feed-gear C and cone-pinion A may not be arbitrary; but the effect on stud K is substantially the same as my sliding gear, and does not depart from the spirit of my invention. I prefer the sliding-gear arrangement, regarding it more simple, durable, and mechanical. Thus it will be seen that I am enabled to change the velocity of feed-stud K to that imparted through either spindle, feed-gear C, or cone-pinion A instantly, and without stopping or retarding the motion of the cone D or its pinion A; also, that by sliding the stud-gear H midway of gear C and cone-pinion A the feed-stud K would remain inactive—a feature greatly desired, as it saves a vast amount of wear to the whole train of feed-works when the latter are not in active use and work is being done on the lathe-centers, such as filing, polishing, hand-tooling, &c.

Fig. 3 represents a fixture that is known to the trade as a "back rest," and it always accompanies a lathe, being necessary in the manipulation of certain kinds of work. Heretofore these back rests have been formed of two sections, the lower one, which I will designate as g, being secured to the bed of the machine in the usual manner. h represents the upper or hinged section, and each of these sections is provided with a semicircular opening, and provided with means, substantially as shown, for adjusting or centering the work.

I do not claim anything in the general construction of the back rest, as my improvements are confined to the means of securing the two sections when the work has been placed between them. In devices of this nature now used the lock-bolt l is pivotally secured in the lower section, as shown, and the sections are slotted, so the lock-bolt can be raised upward, and a nut attached to the top of the said bolt can be tightened by means of a suitable wrench, thereby locking the sections together. Now it is evident to those skilled in the art that this means of fastening is very objectionable, as it requires time, and very often the wrench is not handy or is temporarily lost. To obviate these difficulties I have constructed a locking device which is very simple, easy of operation, and being a part of the locking-bolt itself, cannot become detached and lost. To accomplish this, I construct on the threaded end of locking-bolt a handle, m, and the upper part of the lower section of the back rest is rounded or beveled in such a manner that the handle may be swung in or out, and the lower face of the handle, striking the inclined face of the lower section, permits the operator to bind the two sections close together by simply forcing the handle back upon the top of the swinging section until its center passes the line of the pivot upon which it swings.

To unlock the parts the operator simply draws the handle from its contact with the upper section, when it falls downward and releases the two sections, so that the work may be removed.

Other devices — such as cams, eccentrics, &c.—may be used for the same purpose without departing from the spirit of my invention.

I am aware it is not broadly new to utilize the increased velocity of the cone of a lathe, or of its pinion, for the purpose herein described, and I am also aware it is not new to construct a back rest of two hinged sections and a locking-bolt, and these features I do not claim as my invention; but What I do claim, and desire to secure by Letters Patent, is—

1. In a lathe, the spindle B, feed-stud, and cone D, in combination with the cone-pinion A, feed-gear C, and sliding gear H, the said gears being of the same diameter, or with their teeth formed on the same pitch, substantially as herein set forth.

2. In a lathe, and in combination with the gears A and C, as described, the means herein set forth whereby the revolution of feed-stud K is temporarily stopped by means of a sliding gear or clutch, substantially as described.

3. In a lathe, the feed-stud K, in combination with a sliding gear, H, or its equivalent, and means, substantially as described, for increasing the velocity of the stud, for the purpose herein set forth.

4. In a lathe, the combination of the spindle B, feed-gear C, cone-pinion A, and sliding gear H, substantially as herein set forth.

5. In the head-stock of a lathe, the combination of a feed-stud, K, and sliding gear H, substantially as described.

6. In a lathe, the spindle-gear C and cone-pinion A, of such size and pitch as to permit the sliding of a stud-gear from one to the other, for the purpose set forth.

7. In combination with a lathe, the back rest formed in two sections, the upper section having an inclined or cam face, and a locking-bolt having a handle adapted to engage the face of the upper section, substantially as and for the purpose described.

SALMON W. PUTNAM.

Witnesses:
 GEO. E. PUTNAM,
 WM. H. WHITNEY.